United States Patent
Kopmels

(10) Patent No.: US 7,273,351 B2
(45) Date of Patent: Sep. 25, 2007

(54) COMPONENT HAVING A FILM COOLING ARRANGEMENT

(75) Inventor: Michiel Kopmels, Bristol (GB)

(73) Assignee: Rolls-Royce, PLC, London (GB)

( * ) Notice: Subject to any disclaimer, the term of this patent is extended or adjusted under 35 U.S.C. 154(b) by 0 days.

(21) Appl. No.: 11/266,358

(22) Filed: Nov. 4, 2005

(65) Prior Publication Data

US 2006/0099074 A1   May 11, 2006

(30) Foreign Application Priority Data

Nov. 6, 2004 (GB) ................... 0424593.2

(51) Int. Cl.
F01D 5/18 (2006.01)

(52) U.S. Cl. .................... 416/97 R

(58) Field of Classification Search ........... 415/115; 416/96 R, 97 R
See application file for complete search history.

(56) References Cited

U.S. PATENT DOCUMENTS

| | | | |
|---|---|---|---|
| 3,026,605 A * | 3/1962 | Turner | 29/889.721 |
| 5,062,768 A * | 11/1991 | Marriage | 416/97 R |
| 5,326,224 A * | 7/1994 | Lee et al. | 416/97 R |
| 5,370,499 A | 12/1994 | Lee | |
| 5,419,681 A * | 5/1995 | Lee | 416/97 R |
| 5,486,093 A | 1/1996 | Auxier | |
| 6,267,552 B1 | 7/2001 | Weigand | |
| 6,368,060 B1 | 4/2002 | Fehrenbach et al. | |
| 6,379,118 B2 * | 4/2002 | Lutum et al. | 416/97 R |
| 6,554,572 B2 * | 4/2003 | Rinck et al. | 416/97 R |
| 7,056,093 B2 * | 6/2006 | Self et al. | 416/97 R |
| 2002/0018717 A1 | 2/2002 | Dailey | |
| 2004/0072014 A1 | 4/2004 | Hasz et al. | |

FOREIGN PATENT DOCUMENTS

| | | |
|---|---|---|
| EP | 0 375 175 A1 | 6/1990 |
| EP | 0 466 501 A3 | 1/1992 |
| EP | 0 648 918 A1 | 4/1995 |
| EP | 0 992 654 A3 | 4/2000 |
| EP | 1 326 007 A2 | 7/2003 |
| JP | A 9-144504 | 6/1997 |

* cited by examiner

Primary Examiner—Edward K. Look
Assistant Examiner—Nathan Wiehe
(74) Attorney, Agent, or Firm—Oliff & Berridge, PLC

(57) ABSTRACT

A component such as a turbine blade of a gas turbine engine includes a film cooling arrangement which is optimized by a process in which a component is manufactured having a film cooling arrangement of an initial design and evaluation of the performance of the film cooling arrangement is conducted, for example on the basis of the blowing rate of cooling holes present in the initial design. The configuration of a cooling hole of the initial design is subsequently modified in order to improve the performance of the film cooling arrangement and a component is manufactured in accordance with the modified design. By way of example, the initial design may provide a single cooling hole 128 and the modification may comprise the provision of additional cooling holes 126, 130, each intersecting the initial cooling hole 128 adjacent its inlet end which opens into a source of cooling fluid 120.

17 Claims, 7 Drawing Sheets

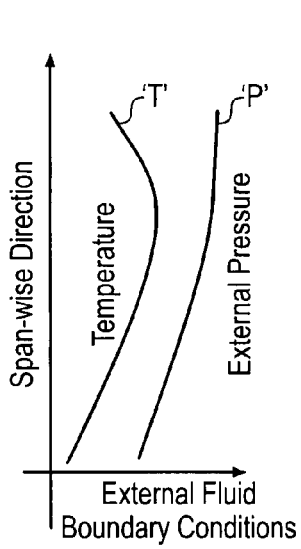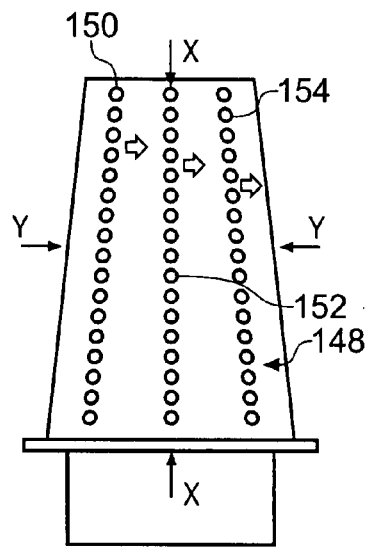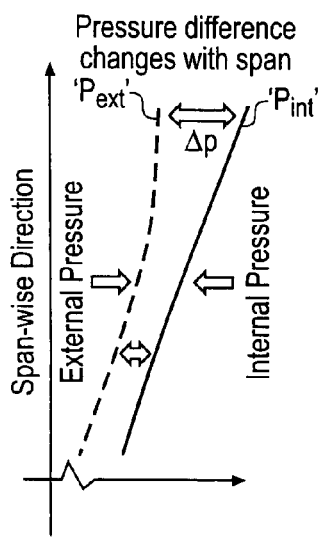
Fig. 10B  Fig. 10A  Fig. 10C
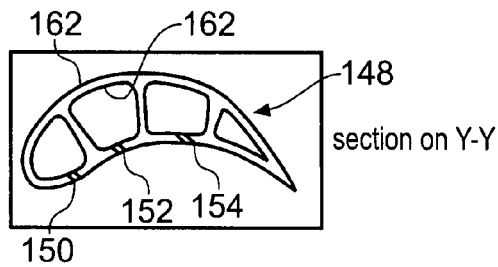
Fig. 10D
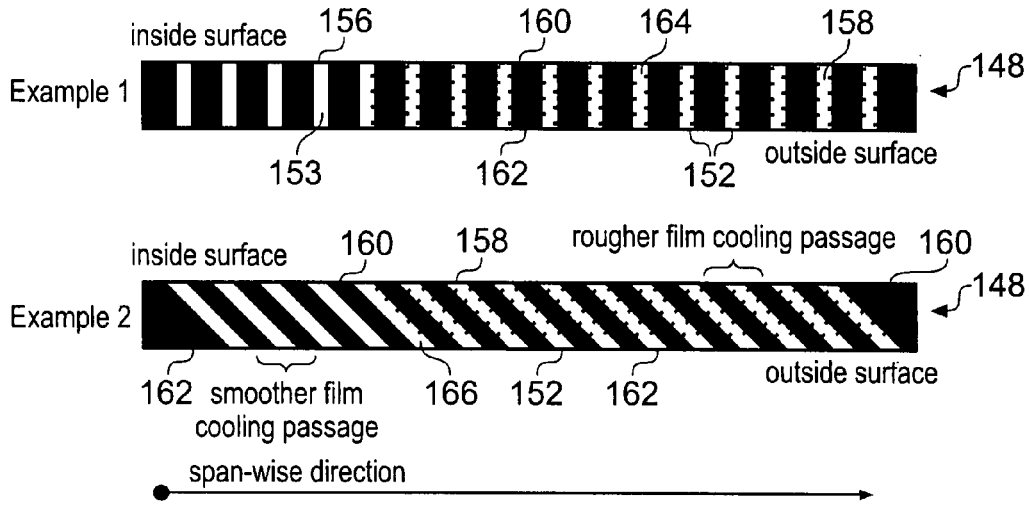
Fig. 11

COMPONENT HAVING A FILM COOLING ARRANGEMENT

This invention relates to a component having a film cooling arrangement. The invention is particularly, although not exclusively, concerned with the optimisation of a film cooling arrangement of a component of a gas turbine engine, such as a turbine blade or nozzle guide vane.

The invention will be found useful not only in respect of blades and vanes, but also other components provided with a surface film cooling arrangement supplied internally by an engine internal air system. References in the following description are intended to be interpreted accordingly, and not to be restricted necessarily to, say, a turbine blade or a vane where only such a component is mentioned.

Turbine blades in gas turbine engines operate in a very high temperature environment, in which combustion gases flowing over the turbine blades can be at a temperature close to, or even exceeding, the melting point of the material, such as a high temperature super-alloy, from which the turbine blade is made. It is known to cool turbine blades by providing within them passages which receive relatively cool air from, for example, the compressor of the engine. Additional cooling is achieved by providing cooling holes extending from the cooling passages within the blade to the external surface of the blade, so that cooling air from the passages can emerge at the external surface and flow along that surface to provide film cooling.

According to the present invention there is provided a component having a film cooling arrangement comprising a plurality of film cooling holes formed by exits of a plurality of cooling fluid passages formed through a wall of the component which communicate with a source of cooling fluid in the interior of the component, the passage exits being spaced apart over at least part of the surface of the component, such that, in operation, a cooling film is maintained over the surface by fluid issuing from the passage exits, wherein some of the cooling fluid passages have a different configuration such that, in use on the basis of a selected performance parameter, all of the film cooling holes reach a chosen level of performance.

In such a component an optimum design of the film cooling arrangement is achieved by controlling the loss within the film cooling holes.

Thus, in accordance with one aspect of the present invention, the configurations of individual film cooling holes are modified in order to optimise the flow from an array of such film cooling holes. For example, the configuration of the cooling hole may be modified so as to increase or decrease the loss within the film cooling hole so that any desirable design parameter can be optimized for the design solution. Typical design parameters that could be optimized include Blowing Rate, Momentum Flux Ratio, or Suction Rate. These are defined as follows:

$$\text{Blowing Rate} = \frac{(\rho \cdot u)_{film}}{(\rho \cdot u)_{external}},$$

$$\text{Momentum Flux Ratio} = \frac{(\rho \cdot u^2)_{film}}{(\rho \cdot u^2)_{external}},$$

$$\text{Suction Rate} = \frac{(\rho \cdot u)_{film}}{(\rho \cdot u)_{internal}},$$

where $\rho$=density and $\mu$=flow velocity and the subscripts refer to position; within the film, internal or external.

The above design parameters are affected by the loss within the film cooling holes and they in turn affect performance parameters such as film effectiveness, aerodynamic loss, internal and external heat transfer and indirectly the life of the component. It is thus by manipulating the loss within the film cooling holes that performance optimisation is achieved. In the context of an aerofoil, the present invention proposes the use of varying film cooling loss in the spanwise and or chord-wise direction of an aerofoil.

As mentioned above, the effectiveness of film cooling is dependent on the blowing rate of the cooling air. The blowing rate is the ratio of the mass flux of cooling air from the cooling holes to the mass flux of hot gas. If the blowing rate is too low, the film may not form properly over the surface of the turbine blade, and so will be inadequate to provide effective cooling. Ideally the air that emerges from the cooling holes forms a film adhering over the whole of the external surface of a blade. However, if the blowing rate is too high, the cooling air will emerge from a cooling hole as a jet which lifts the cooling air clear of the surface so that it does not form an effective cooling film until a position some distance downstream of the cooling hole, with reference to the direction of hot gas flow.

The distribution of the cooling holes is also important. Too few cooling holes can result in inadequate cooling film formation due to uneven coverage, even if the velocity of the emerging air is in a preferred range. Conversely, too many cooling holes are too "expensive" in terms of the amount of air that has to be bled form the compressor to supply them.

The velocity of the cooling air emerging from the cooling holes is dependent on the pressure difference between the ends of the cooling hole passage. The inlet end of the cooling hole passage opens into the internal passage within the turbine blade, while the outlet end is at gas path pressure. In operation, centrifugal effects arising as a result of the rotation of the blade with the turbine disc on which it is mounted result in an increasing internal pressure in the radially outwards direction. This, and factors such as the external temperature distribution, make it very difficult to determine the ideal pattern of loss within the film cooling holes in a turbine blade needed to achieve the best cooling with a minimum requirement for cooling air. Since air for cooling purposes is extracted from the output of the compressor, an oversupply of cooling air unnecessarily reduces the useful power output of the engine and has a detrimental effect on engine efficiency.

Conventionally, when a turbine blade with film cooling is designed, the main priority is to develop a blade profile which fulfills the aerodynamic requirements of the blade. Once the profile of the blade has been determined, the next step is to conduct a stress analysis to ensure that the blade can withstand the stresses to which it will be subjected in operation. Some modification of the configuration of the blade, particularly in the region at which the blade is connected to the turbine disc, may be required at this stage. Finally, consideration is given to cooling of the blade, and the designer must work within the parameters already decided upon for aerodynamic and stress purposes. Once a decision has been made on the internal passage configuration, the pressure difference between the internal passages and the external aerofoil surface is largely fixed and hence the blowing rate from the film cooling holes.

While additional cooling holes may improve the effectiveness of the film cooling, the additional holes also increase the requirement for cooling air, with a consequent reduction in the useful power output of the engine.

The present invention is intended to overcome these drawbacks by providing a prospectus of ways in which individual cooling hole passages may be modified from a basic, uniform passage configuration to achieve a required performance level.

The modification of the configuration of the cooling hole may take any one of a number of forms. For example, the cooling hole passage may be formed to have an enlargement of its flow cross-section between its inlet and outlet ends. The enlargement may take the form of a region of increased flow cross-section extending inwardly from the outlet end of the cooling hole to a predetermined depth, leaving the remainder of the cooling hole with the same flow cross-section as in the initial design, or with a smaller flow cross-section than the initial design. Also, the cooling hole passage may be modified so as to diverge continuously over all or part of its length in the direction from the inlet end to the outlet end. In some circumstances, it may be desirable for the cooling hole passage to be modified so as to converge from the inlet to the outlet ends. Alternatively, cooling hole passages may be provided with a restriction (throttle), heat transfer enhancement features (ribs) or simply increased surface roughness.

It is also possible to modify the configuration of the cooling hole passage by forming an additional cooling hole passage that intersects the original cooling hole passage. The additional cooling hole passage may extend from the source of cooling fluid at a position away from the inlet end of the original cooling hole passage, to intersect that passage part of the way along its length. The initial cooling hole passage may then be blocked, at least partially, at a position between the inlet end and the point of intersection.

Alternatively, the additional cooling hole passage may extend from its point of intersection with the original cooling hole passage to the surface of the component. In some cases, the additional cooling hole passage may extend from the source of cooling fluid to the surface of the component, intersecting the initial cooling hole passage part of the way along its length.

More than one additional cooling hole passage may be provided for each initial cooling hole passage. Each of the additional cooling hole passages may intersect the initial cooling hole passage at the same location, which may be adjacent the inlet end of the initial passage. The additional cooling hole passages may comprise at least one primary additional cooling hole passage which directly intersects the initial cooling hole passage, and at least one secondary additional cooling hole passage which intersects the primary additional cooling hole passage, or one of the primary additional cooling hole passages, but does not intersect the initial cooling hole passage. The preferred cooling design may include a plurality of cooling hole passages, which may be parallel to one another, and the additional cooling hole passage may intersect two or more of the initial cooling hole passages.

The process for optimising a film cooling arrangement may be applied to a component of a gas turbine engine, for example a turbine blade. Rotation of the blade about the axis of the engine in operation will cause, in the radially outwards direction, an increasing pressure in the source of cooling fluid, that is in a passage extending lengthwise (also called spanwise) of the blade. This will have an effect on the blowing rates of cooling holes distributed along the blade in the same direction, and so the process may comprise modification of a cooling hole in the radially outer region of the blade in a manner different from the modification of a cooling hole in a radially inner region.

If the component is a turbine blade having an internal passage or chamber which constitutes the source of cooling fluid, the modification of the cooling hole may be achieved by providing a plurality of additional cooling holes which all communicate with the chamber through the inlet end of the initial cooling hole passage. Where a plurality of initial cooling hole passages are present, for example spaced apart chordwise of the blade, different numbers of additional cooling hole passages may be provided for each of the initial cooling hole passages.

Where the outlet end of the initial cooling hole passage is situated at or adjacent the leading edge of the blade, an additional cooling hole passage may be formed through the blade from the pressure side to the suction side, intersecting the initial cooling hole passage, to provide two additional outlets for cooling air which are supplied through the inlet end of the initial cooling hole passage.

For a better understanding of the present invention, and to show more clearly how it may be carried into effect, reference will now be made, by way of example, to the accompanying drawings, in which.

Figure 6:
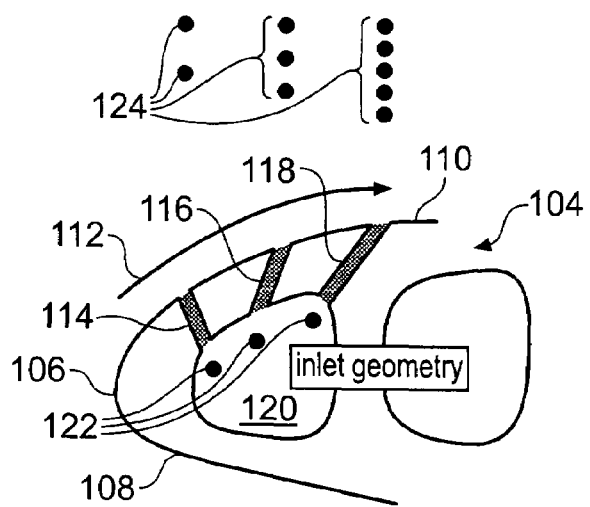
Figure 12:
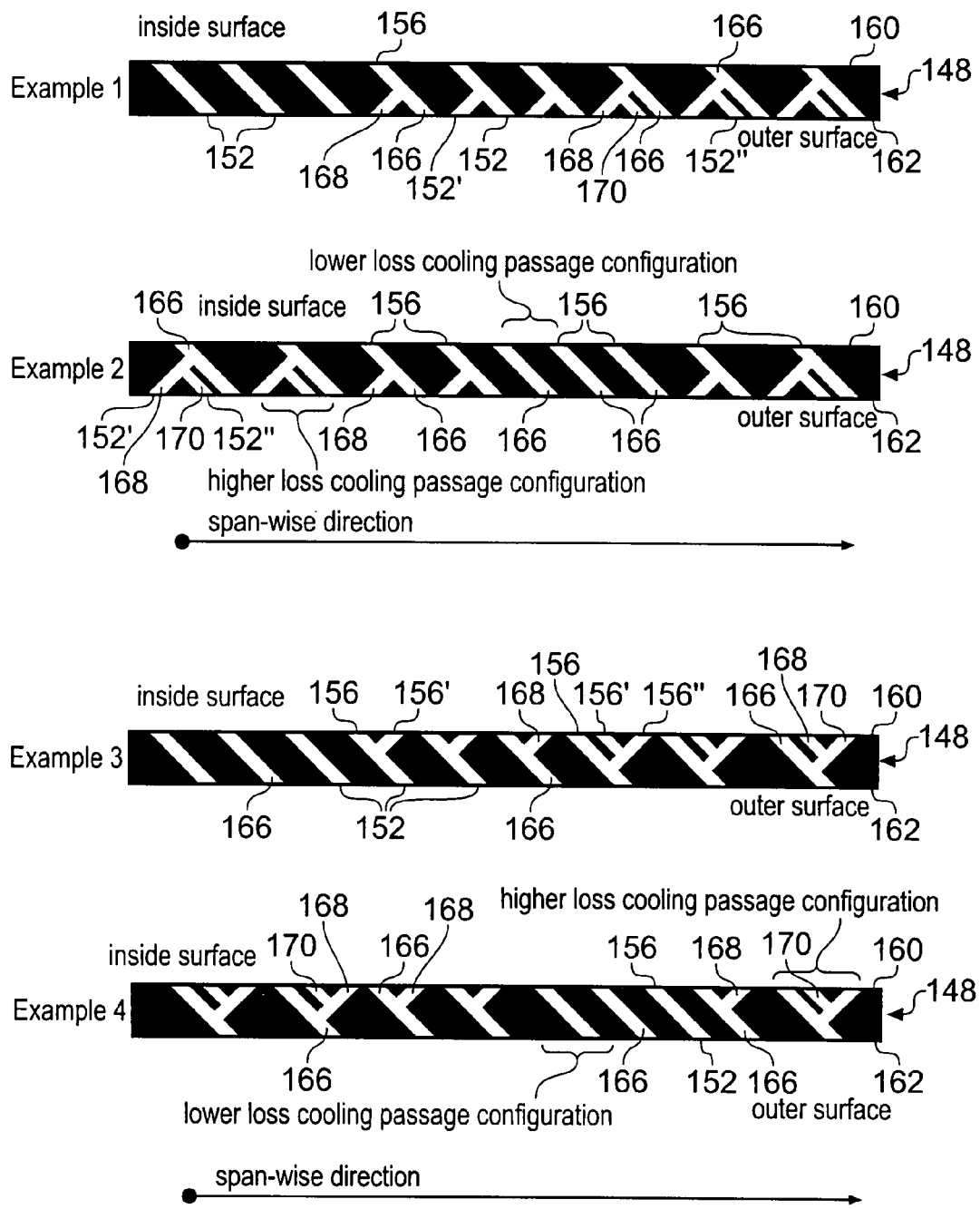
Figure 13:
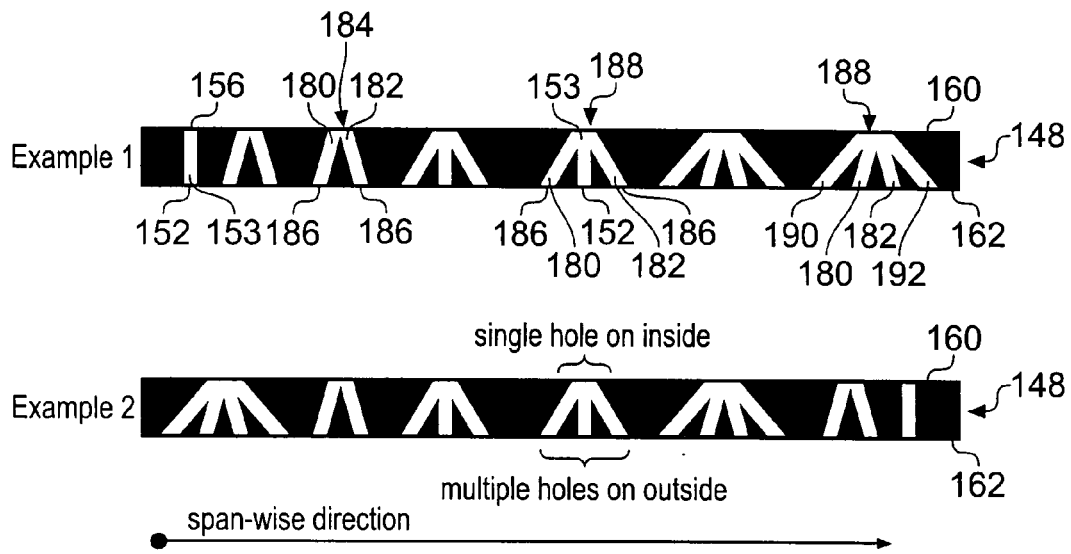
Figure 14:
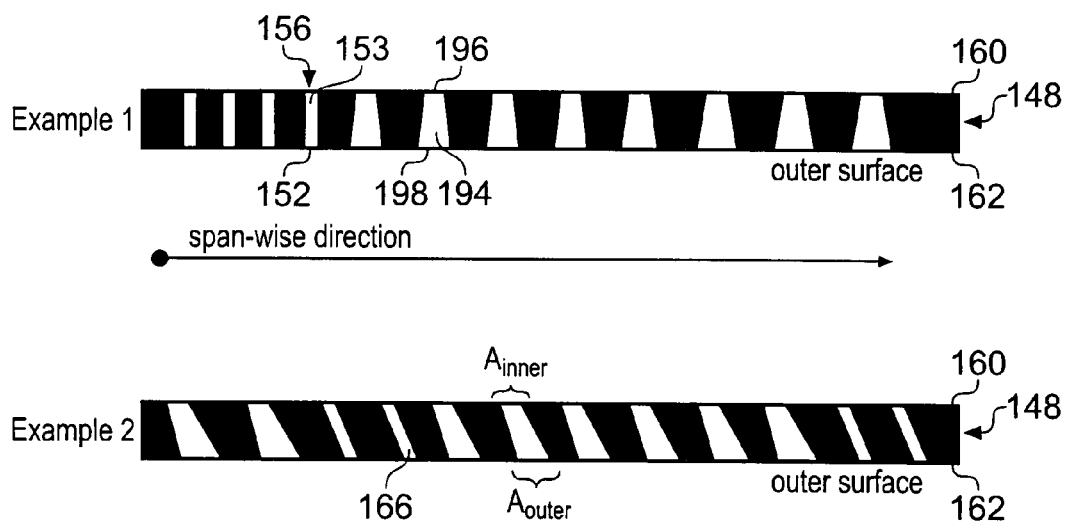

FIGS. 3A to 3E, 4A and 4B, and 5A and 5B show further cooling hole variants;

FIG. 6 shows cooling holes at a leading edge of a turbine blade;

FIGS. 7, 8A and 8B, and FIGS. 9A and 9B correspond to FIG. 6 but show alternative configurations;

FIGS. 10A, 10B, 10C and 10D depict respectively a schematic diagram of a film cooled turbine blade (10A), a graphical representations of the variation of external pressure and gas temperature (10B) and the difference between external and internal pressures (10C) showing the variations with blade height, and a cross-section (10D) on section Y-Y through the blade of 10A;

FIG. 11 shows schematic illustrations of two examples of internal passage "roughness" used to compensate for span-wise variation of losses;

FIG. 12 shows schematic illustrations of four examples of the use of branched cooling passages used to compensate for span-wise variation of losses;

FIG. 13 shows schematic illustrations of two examples of the use of branched cooling passage configurations having different exit/entry area ratios to compensate for span-wise variation of losses; and FIG. 14 shows schematic illustrations of two examples of the use of shaped cooling passage configurations having different exit/entry area ratios to compensate for span-wise variation of losses.

The hole configurations and distribution shown in the drawings are given only for the purpose of illustration and are not intended to limit the scope of the invention. The turbine blade shown in FIG. 1 comprises an airfoil section 2 having a base 4 including a fir tree root 6 at one end and a tip structure 8 at the other end. The airfoil section 2 has a leading edge 10 and a trailing edge 12. Within the blade, there are two cooling arrangements comprising a high pressure supply passage 14 which receives air from the high pressure compressor of the engine to which the blade is fitted, and a low pressure supply passage which receives air from the low pressure compressor of the engine. The high pressure supply passage follows a serpentine route within the blade, beginning near the leading edge 10 of the blade, with the air emerging at the surface of the blade through discharge openings 26.

The low pressure supply passage 18 is provided nearer the trailing edge 12 of the airfoil portion 2. Cooling air from the low pressure supply passage 18 reaches the exterior of the blade through cooling holes formed in the blade, including cooling holes 20 which extend between the supply passage 18 and discharge openings 22 at the trailing edge of the airfoil portion 2. Other discharge openings 24, 25 are provided in the pressure face of the airfoil portion 2, and discharge openings 26 are provided at the tip structure 8.

Figure 1:
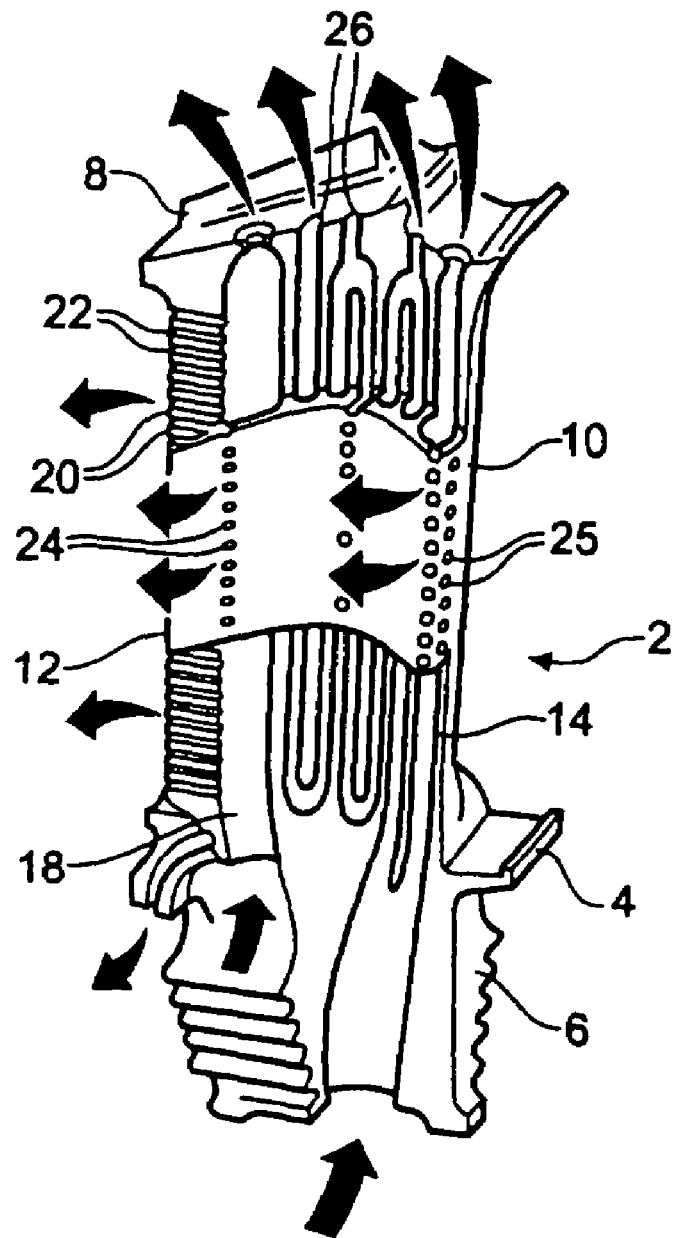
FIG. 1 is a partially sectioned view of a known turbine blade.

When designing the film cooling arrangement of a turbine blade of the kind shown in FIG. 1, and particularly the positions, orientations and sizes of the holes 20 and those terminating at the openings 24 and 25, the designer will initially employ the best theoretical methods available and his or her own experience. Features may be incorporated in the internal structure of the blade, and in particular in the passages 14 and 18 serving as the source for cooling fluid, to control the local internal pressure. Such measures are often required because, in a turbine blade, rotational effects will cause the internal pressure within the blade to rise faster with increasing radius than the external pressure so affecting the flow velocity through the openings 22, 24, 25 and 26, and consequently the blowing rate of the cooling holes. However, it is not practicable to arrange pressure losses internally of the blade in order to maintain ideal blowing rates at all holes from each passage 14, 18. In accordance with the present invention, the control of blowing rate for any particular one of the film cooling holes is achieved locally to that hole, rather than by means situated internally of the blade. A benefit of such local modification is that, after initial design of the blade and the manufacture of prototypes, difficult and time consuming modification of the internal structure of the blade is avoided.

In accordance with the present invention, the cooling effectiveness of the surface film cooling arrangement of an aerofoil may be modified in order to alter the blowing rate of one or more of the film supply holes, or the local effectiveness of the film, or the provide better coverage.

Figure 2:
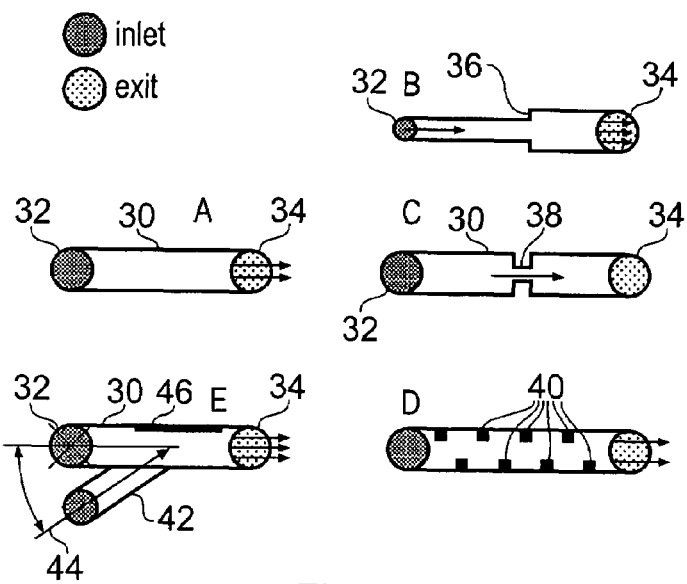
FIGS. 2A to 2E show various cooling hole configurations for the turbine blade of FIG. 1.

For example, with reference to FIG. 2, a film cooling hole 30 according to an initial design is shown in FIG. 2A. The cooling hole 30 is cylindrical and extends in a straight line from its inlet 32 (communicating, for example, with the passage 14 of FIG. 1) to its outlet 34 at the surface of the blade. There is no restriction on the shape of the cross-section of the passage leading to the cooling hole. It does not have to be exclusively cylindrical, although that is probably the most common shape.

FIG. 2B shows one possible modification of the hole 30 of FIG. 2A, in order to reduce its blowing rate. In the variant of FIG. 2B, the hole has a sudden increase in diameter at a step 36 between the inlet end 32 and the outlet end 34. The narrower section extending from the inlet end 32 may have the same diameter as that of the hole 30 of FIG. 2A, but alternatively the entire hole may be modified so that this part of the hole has a smaller diameter than in the initial design. This will reduce the blowing rate of the hole, and the turbulence created at the step 36 will introduce a further pressure loss and a further reduction in the blowing rate.

In the variant of FIG. 2C, a restriction 38 is created within the hole 30. As with the step 36 in FIG. 2B, the restriction 38 will have a throttling effect so causing a pressure drop, which will reduce the blowing rate from the hole 30.

In the variant shown in FIG. 2D, a roughening of the internal surface of the hole 30 is schematically represented by a series of protuberances 40. These protuberances may take a variety of forms, for example ribs, pedestals, pimples or dimples, or may be achieved by a general roughening of the internal surface of the hole 30, for example by electrical discharge machining. The roughness or protuberances will create turbulence in the cooling hole, so leading to a pressure loss and reduced blowing rate.

The variant shown in FIG. 2E comprises the formation of an additional cooling hole 42 which extends from an inlet end 44 spaced from the inlet end 32 of the initial cooling hole 30 but opening into the source of cooling fluid. The additional cooling hole 42 intersects the cooling hole 30 part of the way along its length, and the result is that pressure losses will occur owing to impingement of cooling air flowing along the additional cooling hole 42 with a region 46 of the wall of the hole 30. As shown in FIG. 2E, the inlet end 32 of the initial hole 30 may be blocked or eliminated so that the additional cooling hole 42 carries the entire supply of air to the outlet end 34.

Figure 3:
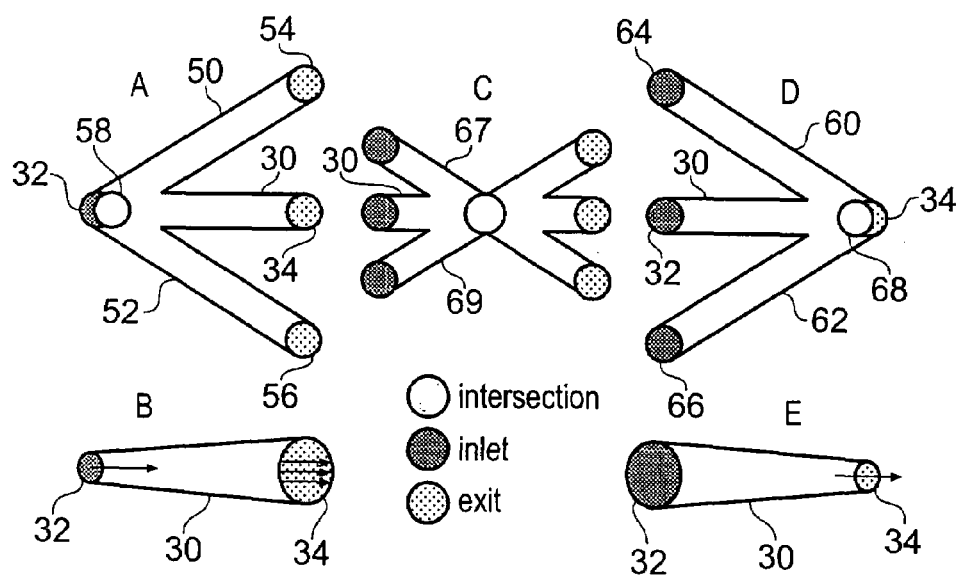

FIGS. 3A, 3C and 3D show further variants employing additional cooling holes. In FIG. 3A, two additional cooling holes, 50, 52 are shown which extend from a position adjacent the inlet end 32 of the initial cooling hole 30 to respective outlet ends 54, 56. Since the minimum flow cross-section occurs at the intersection 58 of the cooling holes, the flow rate through the cooling holes 30, 50, 52 is reduced compared to the flow rate through the initial cooling hole 30. Consequently, the blowing rate at the outlet ends 34, 54, 56 is correspondingly reduced. FIG. 3D shows an arrangement complementary to that of FIG. 3A, in which the additional cooling holes 60, 62 extend from inlet ends 64, 66 to intersect the initial cooling hole 30 at 68, adjacent the outlet end 34 of the initial cooling hole 30. In the variant of FIG. 3C, the additional cooling holes 67, 69 extend from the source of cooling fluid to the surface of the component, intersecting the initial cooling hole 30.

FIGS. 3B and 3E illustrate variants in which the cooling hole 30 is modified to have a converging or diverging shape in the direction from the inlet end 32 to the outlet end 34. Thus, the modifications shown in FIGS. 3B and 3E will result in a decreased blowing rate and an increased blowing rate respectively.

Figure 4:
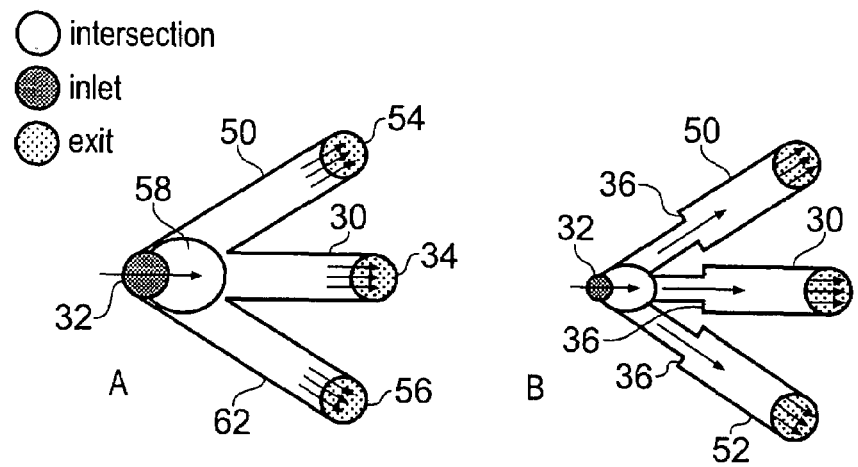

FIG. 4A corresponds to FIG. 3A, in which two additional cooling holes 50, 52 intersect the initial cooling hole 30 at a position close to the inlet end 32. FIG. 4B shows a variant of the arrangement shown in FIG. 4A in which each of the cooling holes 30, 50, 52 is provided with a step increase 36 in the manner shown in FIG. 2B.

Figure 5:
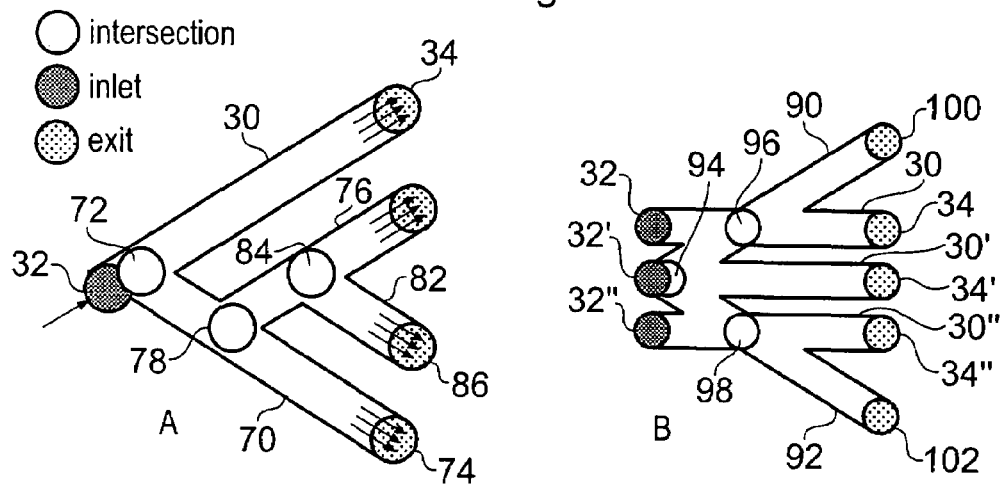

FIG. 5A shows a variant in which a number of additional cooling holes are provided, branching successively from the initial cooling hole 30. In this embodiment, a primary additional cooling hole 70 intersects the initial cooling hole 30 at 72, and opens at the surface of the component at an outlet end 74. A secondary additional cooling hole 76 is also added, intersecting the primary additional cooling hole 70 at a position 78 between the ends of the primary additional cooling hole 70. The secondary additional cooling 76 opens at the surface of the component at an outlet end 80.

It is possible to provide further additional cooling holes, for example a tertiary additional cooling hole 82 which intersects the secondary additional cooling hole 76 at a position 82 between its ends. The tertiary additional cooling hole 82 opens at the surface of the component at an outlet end 86.

FIG. 5B shows a variant in which the initial design comprises a plurality of parallel cooling holes 30, 30' and 30". In this variant, two additional cooling holes 90, 92 are added. These cooling holes 90, 92 both intersect the middle initial cooling hole 30' at a position 94 close to the inlet end 32' of the middle initial cooling hole 30'. The additional cooling holes 90, 92 also intersect, respectively, the outer initial cooling holes 30, 30" at positions between the ends of those initial cooling holes. The additional cooling holes 90, 92 open at the surface of the component at outlet ends 100, 102.

In the embodiments of FIGS. 5A and 5B, the intersections 72, 78, 84 and 94, 96, 98 generate turbulence within the cooling holes, so causing pressure losses which reduce the blowing rate from the cooling holes.

FIG. 6 shows, in the lower part of the drawing, a fragmentary cross-section through the leading edge region of a turbine blade 104. The leading edge is represented by a point 106, and the blade has a pressure surface 108 and a suction surface 110. The flow of hot gas over the suction surface 110 is represented by an arrow 112. The upper part of FIG. 6 represents the disposition of outlet openings of cooling holes disposed in three groups 114, 116 and 118.

The blade 104 includes a passage 120 which corresponds generally to the passage 14 of the blade of FIG. 1. The groups of cooling holes 114, 116 and 118 open into the passage 120 at three respective locations identified schematically by inlet openings 122. Thus, each group of cooling holes 114, 116 and 118 opens into the passage 120 at a respective single inlet opening 122. The inlet openings 122 are spaced apart from each other in the chordwise direction of the blade 104. Each group of cooling holes 114, 116 and 118 comprises at least two cooling holes which emerge at the suction surface 110 at respective outlet openings 124, represented schematically in the upper part of FIG. 6. Thus, the group 114 comprises two cooling holes, the group 116 comprises three cooling holes, and the group 118 comprises five cooling holes. The cooling holes of each group originate from the respective inlet openings 112 and fan out in the radial direction of the blade to form the hole pattern shown in the upper part of FIG. 6.

In developing the design of the film cooling arrangement of the blade 104 of FIG. 6, the initial design may, for example, comprise only three cooling holes in the group 118. If, after evaluation of a prototype, it is found that the blowing rate from the group of cooling holes 118 is too high, then additional cooling holes may be formed, originating at the same inlet opening 122 as the existing cooling holes. Thus, the flow rate through the cooling holes of the group 118 is reduced, so bringing down the blowing rate to achieve more effective film cooling.

It will be appreciated that further groups of cooling passages will be provided, similar to the groups 114, 116 and 118, at different radial positions along the blade. In the example being described in the initial design of the film cooling arrangement, the cooling passage configuration at each position along the blade may be identical, and established on the basis of the average pressure expected in the passage 120. In other examples some allowance may have already been made for a distribution of the boundary conditions. However, the pressure in the passage 120 in operation will vary with radial position, as a result of centrifugal effects acting on the air in the passage 120 when the blade rotates. This may cause the pressure drop between the ends of the cooling holes of the groups 114, 116 and 118 to be considerably higher at radially outer positions of the blade compared to that at radially inner positions. This will increase the blowing rate at the radially outer positions, possibly reducing the effectiveness of the film cooling at those locations. Consequently, while it may be necessary to increase the number of cooling holes in at least one of the groups 114, 116 and 118 at radially outer positions of the blade, it may be necessary to add fewer additional holes, or none at all, at radially inner positions.

Figure 7:
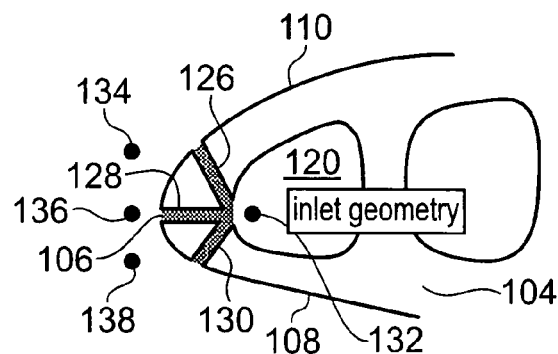

FIG. 7 shows a blade region similar to that of FIG. 6, but illustrates an alternative cooling hole configuration. In this configuration, there are three cooling holes, 126, 128 and 130 at the radial position shown in FIG. 7. All three cooling holes 126, 128, 130 originate at a single inlet opening represented schematically at 132, but they emerge at the surface of the blade 104 at respective different outlet openings 134, 136 and 138. As can be seen in FIG. 7, the outlet opening 136 is situated at the leading edge 106 of the blade 104, while the outlet openings 134 and 138 are situated in the suction surface 110 and the pressure surface 118 respectively. Other hole configurations are possible, for example it may be desirable to have two, or even more, holes on the suction surface and only one on the pressure surface or vice versa.

In the initial design of the film cooling arrangement, only the cooling hole 128 may be provided. However, if, after evaluating a prototype blade, it is found that modification of the film cooling arrangement is required, one or both of the additional cooling holes 126, 130 may be added. As mentioned above other hole distribution arrangements may be desirable according to circumstances.

Figure 8:
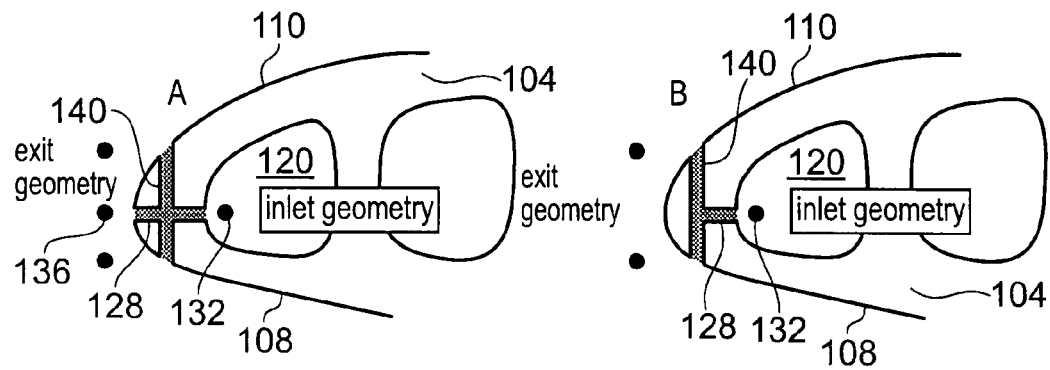

FIG. 8A shows a film cooling arrangement similar to that of FIG. 7, except that, instead of the additional cooling holes 126, 130, a single cooling hole 140 is added extending between the suction and pressure surfaces 110, 108 respectively. The additional cooling hole 140 intersects the initial cooling passage 128, with the result that flow from the holes 128 will be disrupted, creating pressure losses which will reduce the blowing rate at the outlet ends of the cooling holes 128, 140.

FIG. 8B shows an arrangement similar to that of FIG. 8A, except that the cooling hole 128 extends only as far as the intersection with the cooling hole 140.

FIG. 9A shows a modification of the film cooling arrangement of FIG. 8B. In the variant of FIG. 9A, the single cooling hole 140 is supplemented by additional cooling holes 142, 144 which are arranged fanwise about the initial cooling hole 128, so as to increase the number of outlet openings 146. However, all of the cooling holes 140, 142, 144 intersect one another and the cooling holes 128 at a common point at which pressure losses arise in operation.

Figure 9:
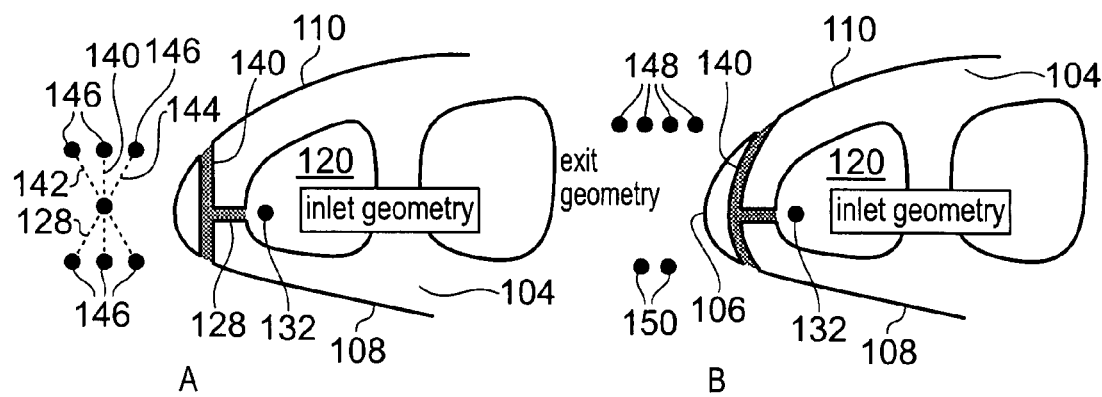

In the variant shown in FIG. 9B, the cooling holes 140 and any additional cooling holes (not shown) are curved in the direction away from the leading edge 106 in the direction away from their intersection with the cooling holes 128. This results in the cooling air being ejected at the surfaces 108, 110 at a more acute angle than is the case with the configuration shown in FIG. 9, so assisting in the generation of a film over the blade surfaces 108, 110.

Also, in the configuration shown in FIG. 9B, the number of additional cooling holes, represented by the outlet openings 148, 150, is greater at the suction surface 110 than at the pressure surface 108, reflecting circumstances in which the required adjustment of the blowing rate is greater at the suction surface 110 than at the pressure surface 108.

In FIG. 10, FIGS. 10B and 10C illustrate the span-wise variation of internal and external pressures and external temperatures (heat load) that give rise to non-optimum cooling film flows. A schematic of a typical turbine blade 148 is shown at FIG. 10A and its cross section at FIG. 10D, the blade design includes three span-wise extending columns of cooling film exit holes at 150, 152 and 154 respectively, which are spaced apart in the direction of the chord of the blade.

FIG. 10B shows at "T" and "P" typical curves representing respectively the temperature and external pressure at the external, gas washed surface 160 (see FIG. 11) of blade 148 at one of the rows of film exit holes 152. The variation of both quantities in the span-wise direction is immediately apparent from the non-linear shape of the curves. FIG. 10C shows at "$P_{ext}$" and at "$P_{int}$" the pressure at the external blade surface 162 and cooling fluid pressure at the internal surface 160 and the pressure difference Δp between them.

It will be apparent from the graphical representations how these parameters vary in the span-wise direction over the height of blade 148. Consider FIG. 10C and in particular how the pressure difference Δp between the internal and external pressures "$P_{ext}$" and at "$P_{int}$" varies with radial height in the blade. The pressure difference Δp drives the supply of cooling fluid to the cooling film through the cooling passages 156 and the cooling film exit holes 150, 152, 154 against the external pressure "$P_{ext}$". If all of the passages 156 and film cooling exit holes 150, 152, 154 are the same size, shape and otherwise substantially the same then the Blowing Rate, Momentum Flux Ratio and the Suction Rate (as defined earlier) will also vary with span height. It would be fortuitous indeed if this span-wise variation turned out to provide the optimum cooling film performance. In practice, therefore up to now, blade designers have made a best guess compromise on performance and accepted the consequence that less than optimum performance in a particular region or regions of the blade may impose a limit on the working life of that blade. The invention provides a solution, or a prospectus of several possible solutions, which are not mutually exclusive which may be utilised to optimise film cooling hole performance. These solutions are illustrated in the drawings of the following FIGS. 11 to 14. These drawings are not drawn to scale and are meant only to depict in schematic form embodiments through which the invention may be carried into practice.

FIG. 11 shows in schematic form a section of the wall in the vicinity of the film cooling passages on the span-wise plane X-X in FIG. 10A through a column of film cooling holes 152 and their supply passages 153. As described above in connection with FIGS. 10A, 10B and 10C there is a span-wise variation of the factors affecting cooling hole performance in an operating gas turbine engine. Assume for the sake of simplicity that there is a simple variation of cooling hole performance with increasing blade height in the radial direction. Then, in the case where the initial or original design of the cooling holes 152 and passages 153 in FIG. 10A is based on a standard size, constant diameter, single passage cooling hole the variation in temperature T, external pressure P and pressure differential Δp will have a varying effect on the performance of the cooling holes 152 in establishing and maintaining an external cooling film over the span height of the blade 148.

In the first example illustrated by FIG. 11, Example 1 the blade fragment 148 as depicted has a constant wall thickness and the passages 153 leading to the cooling holes 152 are formed perpendicular to the inner and outer surfaces 160, 162. In this example the "roughness" of the internal cooling hole passages 153 is varied with span height as indicated by the number of ribs, turbulators or the like indicated at 164 on the internal surface of the passages. In the illustration of Example 1 the passages 153 towards the left of the drawing, at low span height, are smooth and no ribs etc. are present. Modified or internally roughened passages 158 at progressively greater span heights towards the right of the drawing have increasing internal roughness, provided for example by progressively greater numbers of internal ribs 164.

Example 2 in FIG. 11 differs from the first example in that angled passages 166 leading to the holes 152 are formed at an oblique angle with respect to the outer surface 162 of the blade. In other respects the example follows the same principle as in Example 1.

FIG. 12 illustrates the use of branched passages to achieve the desired variation of cooling hole performance. In Example 1, as in previous illustrations the (original) film cooling exit holes 152 in the outer surface 162 of the blade wall 148 comprise the exit apertures 152 created in the surface 162 by the emergence of cooling passages 166. Towards the left of the drawing there are shown several single, original passages 166, these passages are free from internal obstacles or roughness and have no branching passages. Moving from left to right in the drawing, in the next several cooling hole locations the passages 166 of the original passage configuration are supplemented by a first additional, branched passage 168 formed to intersect the passage 166 mid-way through the wall 148. The additional passages 166 emerge at the external surface 162 of the blade to form exit apertures 152'. At the right side of the drawing there are shown in the final several cooling hole locations, a second additional passage 170 formed to intersect the first additional passage 166 towards its mid-point. These second additional passages 170 emerge at the external surface 162 of the blade to form exit apertures 152" in the external surface 162. Fluid flow through all of these film cooling holes is effectively throttled by, i.e. the maximum flow rate is determined by, the size of the original passage 166. The number of branches, size of passage and orientation will be determined by the loss variation required to optimise the flow from the array as a whole. The illustration shown in FIG. 12 is a typical example.

Example 2 of FIG. 12 illustrates a variation of example 1 in which several multiply branched cooling passages comprising original passage 166 and additional passages 168, 170, which in emerging at the external wall surface 162 give rise to cooling holes 152, 152 152". In this embodiment the modified cooling passages are located towards either end of the row of cooling holes.

Examples 3 and 4 of FIG. 12 illustrate variations of an "inverse" configuration in which the additional cooling flow passages are formed towards the internal surface 160, or the cooling fluid entry side of the passages 166. That is the additional passages 168, 170 emerge at the internal surface 160 of the blade wall 148. Again the original fluid entry holes are shown at 156, with the first additional entry holes at 156' and the second additional entry holes at 156". The number, distribution and size of cooling film exit holes 152 in the external surface 162 remains according to the original design configuration. In this example the initial or original passage was designed as a single passageway between entry and exit with smooth walls, this is to be regarded as the original design configuration. The modification may comprise any of the individual variations described or any combination of them together which produce the required losses in a passage.

FIG. 13 illustrates two examples of how branched cooling passage configurations may be employed to produce spanwise variation of the exit/entry area ratios of an array of cooling holes. Example 1 shows a progressive variation from left to right in the drawing by the use of increasing numbers of angled passages or angled and straight passages. Example 1 the original basic cooling passage design is indicated at 153. Where this passage emerges at the internal surface 160 it forms cooling film entry aperture 156, and where it emerges at the external surface it forms cooling film exit aperture 152.

In a first modification to the right of the original hole it has been replaced by a bifurcated hole comprising two branches 180, 182. These branches may coincide at surface 160 to form an elliptical entry hole 184, or may be laterally to form an elongate but substantially elliptical hole. At the external surface this bifurcated passage forms two film cooling exit holes 186 in the outer surface 162. Next, towards the centre of the drawing there is shown a second modification: in which the first modification is constructed coincident with the original passage 156. On the internal surface 160 this produces an entry aperture 188 the shape of which is dependent upon the degree to which the passages 153 180 and 182 are made to overlap. On the external surface 162 each of the three passages emerges separately to form three individual cooling film exit apertures indicated at 152 and 186. At the right side of the drawing in this example there is shown a further variation of four branched passages comprising passages 180, 182 plus additional passages 190, 192. Again these can be arranged on the entry side to produce a single elliptical entry aperture 188, while they emerge at the external surface 162 to form four separate cooling film exit apertures. FIG. 13 Example 2 shows these various modifications interspersed to vary the placement and separation of the cooling film exit holes on the external surface.

FIG. 14 shows still further variations affecting the entry/exit area ratio of the film cooling holes. In Example 1 the basic perpendicular passage 153 is modified by enlargement, for instance by a laser trepanning method to produce a frusto-conical hole 194 which produces entry and exit apertures 196 and 198 respectively in the inner and outer wall surfaces 160, 162. The angles at which the trepanning operation is carried out relative to the lane of the wall surface may be varies to produce differently sized entry and/or exit apertures. Example 2 shows similar trepanning method modification performed on the obliquely angled passage 166, but this here carried out at an angle with respect to the surfaces 160, 162 so that the entry and exit apertures produced are slightly flared towards one side.

It will be understood that the above examples are intended to illustrate the invention and how it may be carried into practice, but are not intended to exclude other ways of creating losses in a cooling passageway in order to achieve the desired objective of this invention. The above examples are given only to illustrate several ways in which the invention may be carried out. The following claims are intended to be interpreted accordingly.

The invention claimed is:

1. A component having a film cooling arrangement comprising:
a plurality of film cooling holes formed by exits of a plurality of cooling fluid passages formed through a wall of the component, the passages being formed to communicate with a source of cooling fluid in the interior of the component, the passage exits being spaced apart over at least part of the surface of the component, such that, in operation, a cooling film is maintained over the surface by fluid issuing from the passage exits, wherein selected ones of the cooling fluid passages are formed with passage branches in which an additional passage is formed from a point of intersection with an original passage to a new fluid exit hole in the surface of the component, whereby the performance of individual cooling holes is optimized by adjusting a design parameter chosen from a range of parameters comprising blowing rate, momentum flux ratio and suction rate, by adapting a different internal configuration for at least one of the cooling fluid passages compared to remaining passages in either a span-wise or chord-wise direction such that, in use on the basis of a selected performance parameter, all of the film cooling holes reach a chosen level of performance.

2. A component as claimed in claim 1, wherein the configuration of an individual cooling passage includes at least one fluid exit hole and at least one fluid inlet hole, wherein to maintain the cooling film in the surface region local to an individual passage exit, the number of fluid exit holes and the number of fluid inlet holes is chosen on the basis of the selected performance parameter to provide a performance level required from each film cooling hole to maintain the surface film in the region local to said individual passage exit.

3. A component as claimed in claim 2, wherein the chosen passage configuration comprises at least one additional branch leading to at least one additional fluid exit hole.

4. A component as claimed in claim 3, wherein the chosen passage configuration comprises an array of branched passages leading to multiple fluid exit holes.

5. A component as claimed in claim 3, wherein a plurality of additional passages intersects the original cooling passage at a common position adjacent the fluid inlet end of the original passage.

6. A component as claimed in claim 5, wherein the additional passages comprise a primary additional passage which intersects the original cooling passage, and a secondary additional cooling passage which intersects the primary additional passage.

7. A component as claimed in claim 3, wherein the original design comprises a plurality of cooling passages, and the additional cooling passage intersects at least two of the original cooling passages.

8. A component as claimed in claim 1, wherein a chosen passage configuration includes at least one additional fluid inlet hole that extends from the source of cooling fluid to intersect the original cooling hole passage.

9. A component as claimed in claim 8, wherein an original cooling hole passage is closed at a position upstream of a point of intersection with an additional passage.

10. A component as claimed in claim 1, wherein in the chosen passage configuration, the effective area of the fluid exit holes of a passage is altered relative to the effective area of the corresponding fluid inlet holes.

11. A component as claimed in claim 10, wherein in the chosen passage configuration, the passage is formed as a duct, which is divergent in the direction from the fluid inlet holes to the fluid exit holes.

12. A component as claimed in claim 10, wherein the chosen passage configuration comprises a duct, which is convergent in the direction from the fluid inlet holes to the fluid exit holes.

13. A component as claimed in claim 1, wherein the chosen passage configuration includes a flow restriction within the passage.

14. A component as claimed in claim 1, wherein the chosen passage configuration includes surface roughness on the wall of the passage.

15. A component as claimed in 14, wherein the surface roughness on the wall of the passage comprises at least one of turbolators, ribs and the like.

16. A component as claimed in claim 1, wherein the component is a component of a gas turbine engine.

17. A component as claimed in claim 16, wherein the component is a turbine blade.

* * * * *